UNITED STATES PATENT OFFICE.

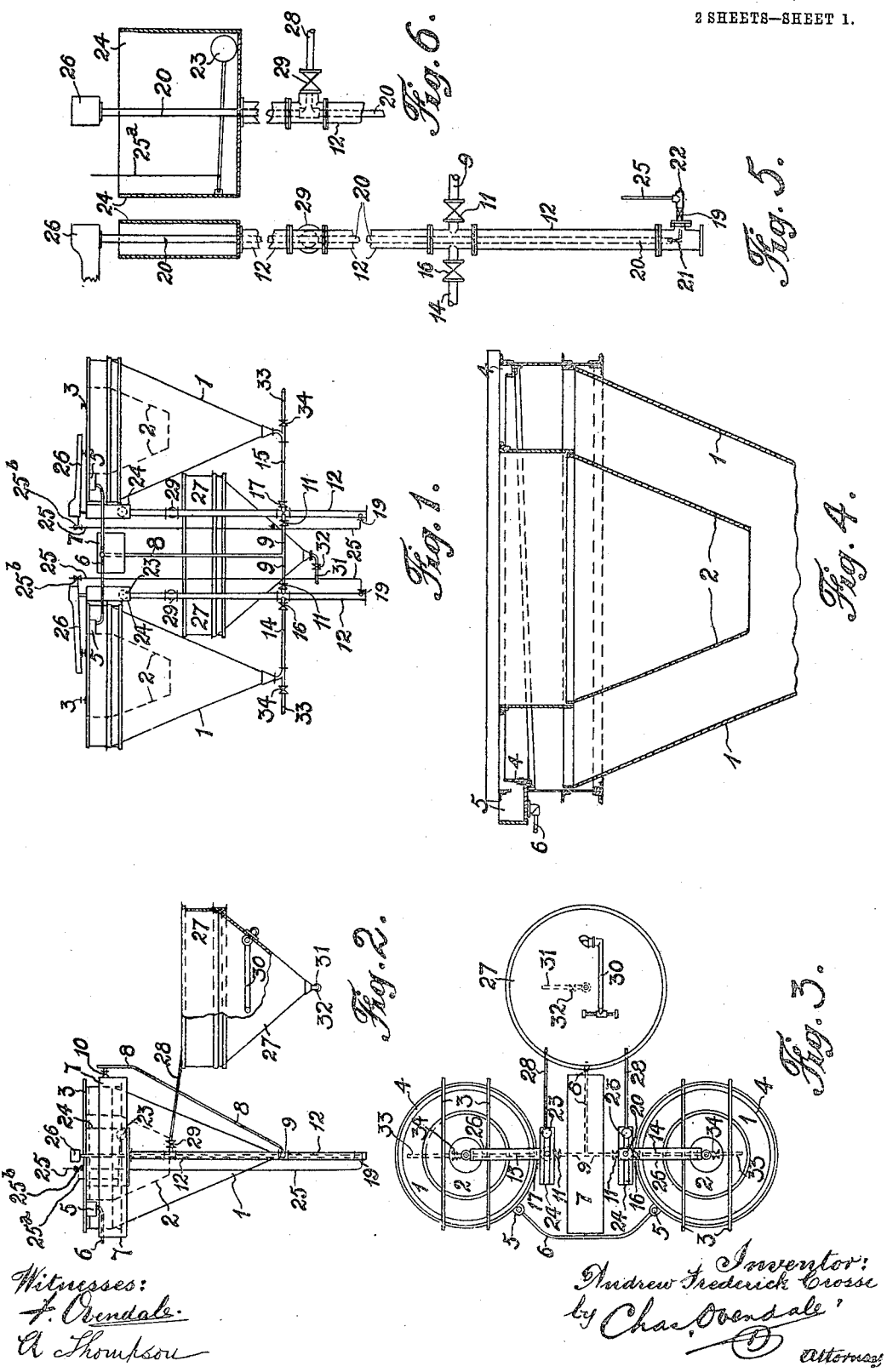

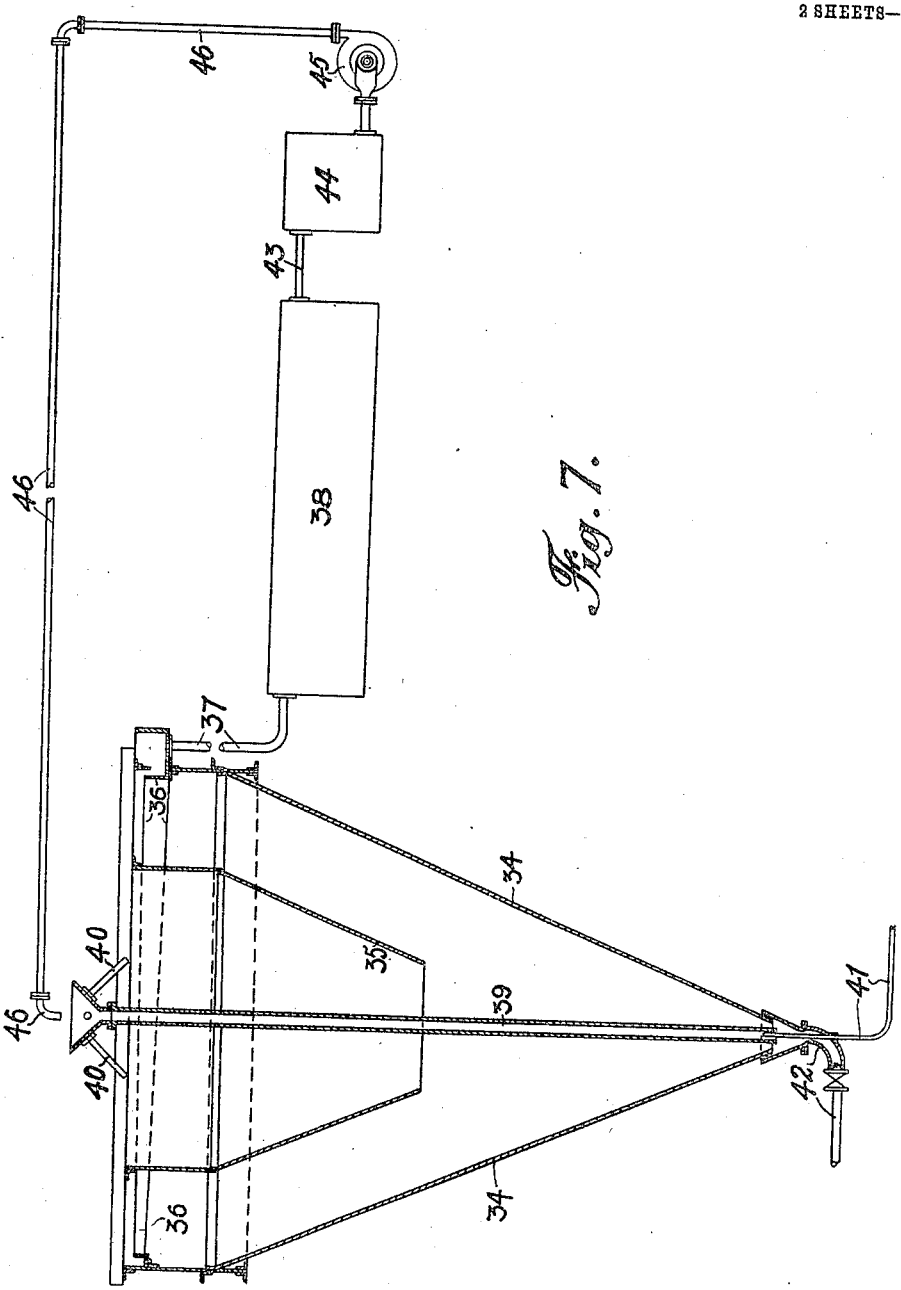

ANDREW FREDERICK CROSSE, OF JOHANNESBURG, TRANSVAAL.

EXTRACTING GOLD AND SILVER FROM ORE-SLIMES.

951,940. Specification of Letters Patent. Patented Mar. 15, 1910.

Application filed July 7, 1908. Serial No. 442,428.

*To all whom it may concern:*

Be it known that I, ANDREW FREDERICK CROSSE, a subject of the King of Great Britain, and resident of Johannesburg, Transvaal, have invented certain new and useful Improvements in Extracting Gold and Silver from Ore-Slimes, of which the following is a specification.

This invention relates to the extraction of gold and silver from ore slimes, i. e., the minute particles of pulverized ore mixed with liquid. It is designed with the object of treating the material effectually and expeditiously, and consists in treating the slimes with solvent solution, obtaining a thickened pulp or concentrated underflow and a clear overflowing liquid, extracting the precious metal contents from the overflowing solvent solution, then directly returning the solvent solution freed of the precious metals and mixing it with the concentrated underflow, so that the solids are repeatedly treated with the solvent solution during circulation and until practically the whole of the precious metal contents are extracted.

By this invention the time required for extracting the precious metal contents of the slimes, and the initial and working costs of the plant, as compared with existing processes or modes of treatment, are considerably reduced. Further, the necessity for the employment of filter presses for effecting the separation of the solids from the liquid, and the decantation of the liquid from time to time as practiced in existing processes or modes of treatment, are rendered unnecessary.

With this invention the dissolving of the precious metal contents of the slimes is very much more rapid than in existing processes, due to the continued aeration of the mixture of slimes and solvent solution, and the precipitation of the gold and silver is much more complete.

A further advantage accruing to this invention is that it is possible to check the working of the process without interrupting the operation. The percentage of cyanid and the alkalinity of the liquid or solution can be determined very quickly, and if necessary, at any time increased, without interrupting the continuity of the process. Once the operation is commenced, except for an occasional checking of the strength of the solution, practically no labor is required until the treatment of the slimes is completed and the residue is ready for discharge or conveyance to the dump.

For the carrying out of this invention I may use a concentrator or classifier, preferably in the form of a conoidal vessel provided with an annular overflow or rim launder; means (preferably an ordinary zinc precipitation box) for extracting the precious metals from the solvent solution or liquid overflowing from the concentrator or classifier; an air lift pump for returning the concentrated underflow or thickened mixture and solution freed of the precious metals to the top of the concentrator; and a supply of compressed air at a pressure proportionate to the height the mixture has to be lifted.

I will proceed to further describe my invention by aid of the accompanying drawings, in which—

Figure 1 is a front elevation of a general arrangement of plant for carrying out my invention. Fig. 2 is a side elevation of Fig. 1, with one of the treatment tanks 1, and its connections removed. Fig. 3 is a plan of Fig. 1. Fig. 4 is an enlarged view of the concentrator or classifier. Fig. 5 is a side elevation of the air lift pump and its connections, Fig. 6 is a part sectional elevation at right angles to Fig. 5, showing the float box with the rod for operating the air valve, and Fig. 7 is a slightly modified arrangement of a plant for carrying out the invention.

Referring more particularly to the arrangement illustrated in Figs. 1, 2 and 3, 1 represents suitable treatment tanks, (shown of inverted cone shape for the greater portion of their height and cylindrical for the remaining portion,) into which the slimes containing the gold and silver values are conducted. The slimes are preferably first mixed with water (in which case the solvent solution would be subsequently added) or cyanid or other solvent solution in the usual proportion to obtain a liquid pulp or mixture of the solids and liquid of a suitable degree of fluidity.

2 represent conical baffles supported in the tanks 1 by girders 3 resting upon or secured to the upper edges of the tanks. These baffles 2 serve for preventing the too violent agitation of the mixture as it flows into the tanks, and facilitate the settlement of the solids.

Each of the tanks 1 is provided with an annular overflow or rim launder 4 having a pocket 5 and pipe connection 6 (see more particularly Fig. 4) communicating with an ordinary precipitation box 7. The precipitation box 7 is placed in communication, through suitable pipe connections 8, 9, provided with cocks or valves 10, 11, with air lift pumps 12, which are also connected with the bottoms of the tanks 1 by pipes 14, 15, provided with cocks or valves 16, 17.

Each of the air lift pumps, as shown more particularly in Figs. 5 and 6, comprises a well 12 having an air admission pipe 25 fitted with cock 19, and the lift pipe 20. The air pipe 25 is connected to the bottom of the well 12 and is provided with the usual nozzle 21 and a cleaning plug 22. The admission of the air to the pump is controlled by a float 23 suitably disposed in a float box 24. The float lever is connected to a rod 25$^a$ which at its other extremity is connected to and actuates a valve 25$^b$, see Figs. 1 and 2.

26 represent launders shown attached to and arranged to receive the mixture from the lift pipes 20 of the pumps. These launders 26 deliver the mixture elevated by the pumps 12, to the tanks 1.

27 represents a suitable settling vat or tank into which the finished or treated material is conducted from the air lift pumps 12 by pipes 28 provided with cocks 29. The settling tank is preferably provided with a decanting arm 30.

31 represents the discharge pipe at the bottom of the settling vat, which pipe 31 is fitted with a cock 32.

33 represent pipes fitted with cocks 34, which may be used for discharging the material instead of conducting it to the settling vat.

The operation may be briefly described as follows:—The slimes containing the metal values to be extracted having been preferably first mixed with water (to which the solvent solution would be subsequently added) or cyanid or other solvent solution in the usual proportion to obtain a liquid pulp or mixture, are conducted into the baffle cones 2 of the concentrators or conical vats 1 wherein the solids settle and from which the separated liquid overflows into the annular overflow or rim launders 4. From the rim launders 4 the liquid (now bearing a certain proportion of the metal values) flows into the precipitation box 7, wherein the values are precipitated, and from thence by the pipes 8, 9, to the wells of the air lift pumps 12 and to the float boxes 24. The valves 16, 17 on the connections 14, 15, between the bottoms of the tanks 1 and air lift pumps 12 are now opened and the concentrated underflow permitted to gravitate into the wells of the pumps 12 to mix with the now barren solution from the zinc box 7. The air supply is now admitted through the nozzles 21 and the mixture of slime and solution forced or lifted up the lift pipes 20 to the launders 26 from whence it gravitates back to the tanks 1. It will be obvious that the rate of flow of the pulp or concentrated underflow into the well of the pump 12 will depend on the resistance head of the liquid contained therein, and if this head be maintained as nearly as possible constant, say by the float 23, and rod 25$^a$ regulating the air supply through valve 25$^b$, the rate of flow will remain practically constant. The mixture conducted back to the tanks 1 again separates into the clear overflowing liquid and concentrated or thickened pulp, and the clear overflowing liquid, which is maintained at the requisite strength of cyanid and alkali, passes continuously through the precipitation box 7 and having been deprived of its precious metal contents returns to the air lift pumps 12 to mix with the thickened pulp from the vats. As the mixture of the solvent solution and solids is continuously circulated as described and the solid matter thoroughly and continuously aerated in its passage through the lift pumps, more and more of the precious metal contents of the slimes is extracted by the solvent solution, and the operation is continued until practically all the precious metal has been dissolved and precipitated. The now treated mixture is transferred to the settling tank 27 by opening the valves 29, which permit the thickened pulp and solution remaining in the vats 1 to gravitate along the pipes 28 down to the level of the top of the settling vat 27. The transfer is completed through the same pipes 28 by the air lift pumps 12. The solution separated in the settling vat 27 is run off through the decanting arm 30 to a suitable receptacle, and the residue conveyed to the dump or depositing site.

In the modified arrangement illustrated in Fig. 7, 34 represents the treatment vat or tank, 35 the conical baffle, 36 the annular overflow or rim launder, and 37 the pipe connection with the precipitation box 38. In this arrangement the lift pipe 39 of the pump which is provided with suitable spreaders or distributers at the top, is disposed within the treatment vat 34 (which serves as the well of the pump), and the compressed air inlet pipe 41 shown projected through the discharge pipe 42. Although I show the barren solution conducted from the precipitation box 38 by pipe 43 to a suitable receiver or sump 44 and conveyed therefrom to the top of the lift pipe 39 by centrifugal or other suitable pump 45 and pipe connections 46, it will be apparent that the solution may be returned or conducted to the treatment vat 35 or air lift 39 at the bottom thereof. The operation of this arrangement is as follows:—The ore slimes, preferably mixed with the requisite cyanid or other solution, are run into the treatment vat 34 the air supply turned on and the separated liquid allowed to overflow into the precipitation box 38 and from thence to the sump or receiver 44. From the sump 44 the solution freed of its metal contents is preferably conveyed to the top of the air lift 39 wherein it mixes with the thickened pulp elevated by the air lift. The mixture is continuously circulated in the treatment vat until all the precious metal contents of the ore slimes are extracted, the solids allowed to settle and the solution remaining in the vat decanted off for further use.

What I claim as my invention and desire to protect by Letters Patent is:—

1. In the process of extracting gold and silver from ore slimes, continually circulating the solvent solution with the ore pulp, extracting the precious metals from the solution, thickening the slimes, and directly returning the solution to further treat the thickened slimes.

2. In the process of extracting gold and silver from ore slimes, continuously treating the slimes in a suitable concentrator with solvent solution, allowing the solids to settle and the metal bearing solution to overflow, extracting the metal contents of the overflowing liquid, mixing the thickened pulp with the returned solution by means of air under pressure to obtain a thorough aeration of the mixture, and returning the aerated mixture to the concentrator.

3. In the process of extracting gold and silver from ore slimes, continuously treating the slimes in a suitable concentrator with solvent solution, allowing the solids to gravitate to the bottom thereof and the clear liquid to overflow, extracting the precious metal contents of the overflowing liquid, mixing the thickened pulp with the barren solution and directly returning the aerated mixture by air under pressure to the concentrator.

4. In the process of extracting gold and silver from ore slimes, mixing the ore slimes with solvent solution in the usual proportion to obtain a liquid pulp, passing the liquid pulp into a suitable concentrator, allowing the solids to gravitate and the separated liquid to overflow, extracting the precious metal contents of the overflowing liquid, returning the solution freed of its metal contents to mix with the thickened pulp and air under pressure, and returning the aerated mixture by air under pressure to the concentrator.

5. In the process of extracting gold and silver from ore slimes, continuously treating the slimes in a suitable concentrator with solvent solution, allowing the solids to gravitate to the bottom thereof, and the clear liquid to overflow to suitable precipitation means, precipitating the precious metal contents of the overflowing liquid, directly conducting from the precipitating means the solution freed of its precious metal contents to mix with the concentrated underflow, directly conducting the concentrated underflow from the concentrator to mix with the solution freed of its precious metal contents, mixing the concentrated underflow and the solution freed of its precious metal contents by means of air under pressure, and directly returning the aerated mixture by air under pressure to the concentrator.

In witness whereof I have hereunto set my hand in the presence of two subscribing witnesses.

ANDREW FREDERICK CROSSE.

Witnesses:
CHAS. OVENDALE,
R. OVENDALE.